(12) United States Patent
Kotake et al.

(10) Patent No.: US 11,117,111 B2
(45) Date of Patent: Sep. 14, 2021

(54) APPARATUS FOR PRODUCING WATER-ABSORBING RESIN PARTICLES

(71) Applicant: SUMITOMO SEIKA CHEMICALS CO., LTD., Hyogo (JP)

(72) Inventors: Masato Kotake, Himeji (JP); Tetsuya Takechi, Himeji (JP); Hideo Kazama, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 16/909,145

(22) Filed: Jun. 23, 2020

(65) Prior Publication Data

US 2020/0316549 A1   Oct. 8, 2020

Related U.S. Application Data

(63) Continuation of application No. 16/088,653, filed as application No. PCT/JP2017/005665 on Feb. 16, 2017, now Pat. No. 10,730,028.

(30) Foreign Application Priority Data

Mar. 31, 2016   (JP) .............................. JP2016-071026

(51) Int. Cl.
*B01J 8/10* (2006.01)
*C08J 3/24* (2006.01)
(Continued)

(52) U.S. Cl.
CPC . *B01J 8/10* (2013.01); *B01J 8/00* (2013.01); *B01J 8/003* (2013.01); *B01J 8/085* (2013.01);
(Continued)

(58) Field of Classification Search
CPC .... B01J 8/085; B01J 8/10; B01J 2208/00212; B01J 2208/0015; B01J 2208/00152;
(Continued)

(56) References Cited

U.S. PATENT DOCUMENTS

| 2,572,068 A | 10/1951 | Sommer |
| 2,726,852 A | 12/1955 | Sommer |

(Continued)

FOREIGN PATENT DOCUMENTS

| EP | 0 234 202 A1 | 9/1987 |
| EP | 1 191 051 A2 | 3/2002 |

(Continued)

OTHER PUBLICATIONS

Office Action dated Sep. 29, 2020, issued in counterpart JP Application No. 2018-508557, with English translation. (8 pages).

(Continued)

*Primary Examiner* — Lessanework Seifu
(74) *Attorney, Agent, or Firm* — Westerman, Hattori, Daniels & Adrian, LLP

(57) ABSTRACT

An apparatus for producing water-absorbing resin particles for which surface cross-linking treatment is conducted, the surface cross-linking treatment being conducted by spraying a surface cross-linking agent to a water-absorbing resin particle precursor and heating the agent and the precursor, the apparatus includes a treatment container in which the surface cross-linking treatment is conducted, a stirring device including a stirring member disposed in the treatment container, a heating device that heats an inside of the treatment container; and a spray nozzle disposed in the treatment container, the spray nozzle spraying into the treatment container the surface cross-linking agent supplied from a surface cross-linking agent supply source in an exterior of the treatment container through a supply pipe. In a flow path in the spray nozzle spanning from an entrance of the spray nozzle to a spray exit, a point whose opening cross-section is smallest in a flow path through which a fluid passes is the spray exit. A product with further stable physical properties can thereby be acquired.

9 Claims, 5 Drawing Sheets

(51) Int. Cl.
*B01J 20/30* (2006.01)
*B01J 8/00* (2006.01)
*B01J 8/08* (2006.01)
*B01J 20/26* (2006.01)

(52) U.S. Cl.
CPC ............ *B01J 8/087* (2013.01); *B01J 20/267* (2013.01); *B01J 20/3078* (2013.01); *B01J 20/3085* (2013.01); *C08J 3/24* (2013.01); *B01J 2208/00212* (2013.01); *B01J 2208/00867* (2013.01); *B01J 2208/00902* (2013.01); *B01J 2220/68* (2013.01); *C08J 3/245* (2013.01); *C08J 2333/02* (2013.01)

(58) Field of Classification Search
CPC .... B01J 2208/00902; B01J 2208/00867; B01J 20/267; B01J 20/3078; B01J 20/3085; B01J 2219/182; C08J 3/24; C08J 3/245; C08J 3/247
See application file for complete search history.

(56) References Cited

U.S. PATENT DOCUMENTS

| | | | |
|---|---|---|---|
| 3,045,932 | A | 7/1962 | Steinen |
| 3,463,397 | A | 8/1969 | MacKlin et al. |
| 3,759,631 | A | 9/1973 | Rybicki |
| 4,076,663 | A | 2/1978 | Masuda et al. |
| 4,263,091 | A | 4/1981 | King |
| 4,446,261 | A | 5/1984 | Yamasaki et al. |
| 2002/0061978 | A1 | 5/2002 | Hatsuda et al. |
| 2007/0149760 | A1 | 6/2007 | Kadonaga et al. |
| 2010/0047445 | A1 | 2/2010 | Barthel et al. |
| 2010/0104761 | A1 | 4/2010 | Barthel et al. |
| 2011/0319518 | A1 | 12/2011 | Kadonaga et al. |
| 2014/0042364 | A1 | 2/2014 | Nogi et al. |
| 2014/0107293 | A1 | 4/2014 | Kadonaga et al. |

FOREIGN PATENT DOCUMENTS

| | | |
|---|---|---|
| EP | 2 669 319 A1 | 12/2013 |
| JP | 49-43395 A | 4/1974 |
| JP | 51-125468 A | 11/1976 |
| JP | 52-14689 A | 2/1977 |
| JP | 57-21405 A | 2/1982 |
| JP | 57-158209 A | 9/1982 |
| JP | 58-171254 U | 11/1983 |
| JP | 62-172006 A | 7/1987 |
| JP | 4-246403 A | 9/1992 |
| JP | 7-242709 A | 9/1995 |
| JP | 2002-201290 A | 7/2002 |
| JP | 2003-238696 A | 8/2003 |
| JP | 2003-292472 A | 10/2003 |
| JP | 2010-521578 A | 6/2010 |
| JP | 2015-14002 A | 1/2015 |
| WO | 2012/102406 A1 | 8/2012 |
| WO | 2013/143943 A1 | 10/2013 |

OTHER PUBLICATIONS

International Search Report dated May 16, 2017, issued in counterpart International Application No. PCT/JP2017/005665 (2 pages).
Notification of Transmittal of Translation of the International Preliminary Report on Patentability (Form PCT/IB/338) issued in counterpart International Application No. PCT/JP2017/005865 dated Oct. 11, 2018 with Forms PCT/IB/373 and PCT/ISA/237. (6 pages).
Extended (Supplementary) European Search Report dated Sep. 16, 2019, issued in counterpart EP application No. 17773794.7. (9 pages).
H. Ikeuchi & Co. Ltd, "Catalog on Pneumatic Spray nozzles—15H", Jul. 13, 2018, pp. 1-8, XP055609406, Retrieved from the Internet: URL:https://www.kirinoikeuchi.co.jp/eng/downlaod/ctaloh/pdf/100c.pdf, cited in Extended European Search Report dated Sep. 16, 2019. (8 pages).
Anonymous: "Spray nozzle-Wikipedia", Mar. 29, 2016, pp. 1-10, XP055609396, Retrieved from the Internet: URL: https://en.wikipedia.org/w/index.php?title=Spray_nozzle&oldid=712525268, cited in Extended European Search Report dated Sep. 16, 2019. (10 pages).
Office Action dated Apr. 17, 2020, issued in counterpart KR Application No. 10- 2018-7028147, with English translation (8 pages).

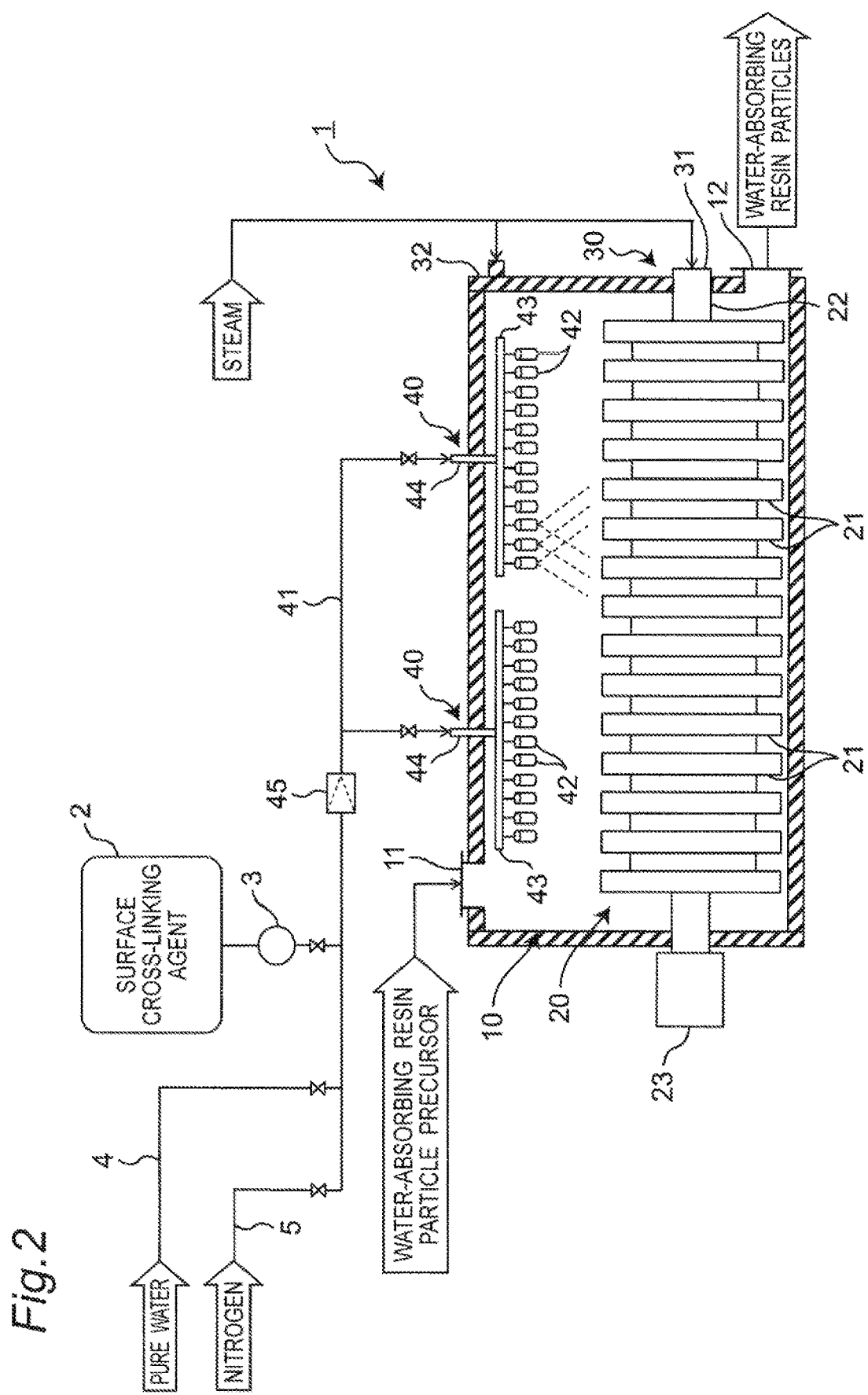

APPARATUS FOR PRODUCING WATER-ABSORBING RESIN PARTICLES

This application is a continuation of U.S. patent application Ser. No. 16/088,653 filed on Sep. 26, 2018, which is a U.S. National Stage entry of International Application No. PCT/JP2017/005665 filed on Feb. 16, 2017, which claims priority from Japanese Application No. 2016-071026 filed on Mar. 31, 2016, the entire disclosure of each of the foregoing is herein incorporated by reference.

TECHNICAL FIELD

This disclosure relates to an apparatus for producing water-absorbing resin particles, that conducts surface cross-linking treatment by spraying a surface cross-linking agent to a water-absorbing resin particle precursor and heating them to acquire surface cross-linking treated water-absorbing resin particles.

BACKGROUND ART

Water-absorbing resin particles are used in a wide range of fields such as the use for sanitary materials such as sanitary products and disposable diapers, the use for agriculture and gardening such as water-retaining agents and agricultural ameliorants, or the use for industrial materials such as water-stopping agents and dew-condensation preventing agents. The water-absorbing resin particles are actively used especially in the fields related to the sanitary materials.

The water-absorbing resin particles used in the various types of use are lightly cross-linked high molecules and, for example, starch-based water-absorbing resins such as a hydrolysate of a starch-acrylonitrile graft copolymer (Patent Document 1) and a neutralized product of a starch-acrylic acid graft copolymer (Patent Document 2), a saponified product of a vinyl acetate-acrylic acid ester copolymer (Patent Document 3), and partially-neutralized products of polyacrylic acid (Patent Document 4, Patent Document 5, and Patent Document 6) are known.

These types of water-absorbing resin particles are each acquired by polymerizing, drying, and, when necessary, crushing and classifying while the water-absorbing resin particles are also modified after the polymerizing and the drying by adding various types of compound to the acquired water-absorbing resin particles to further impart additional functions thereto. A what-is-called surface cross-linking technique is known as a modification method for the water-absorbing resin particles according to which the vicinity of the surface of the water-absorbing resin particle precursor is cross-linked by a surface cross-linking agent. What is considered to be most important in the surface cross-linking treatment is to uniformly surface-cross-link the surface of each of the water-absorbing resin particles and, to do this, uniform mixing of the water-absorbing resin particle precursor and the surface cross-linking agent with each other before the surface cross-linking is important.

Such methods are known as the techniques to uniformly mix the water-absorbing resin particle precursor and the surface cross-linking agent with each other before the cross-linking is conducted, as a method of spraying a surface cross-linking agent in fine liquid droplets to thereby bring the surface cross-linking agent in contact with a water-absorbing resin powder (Patent Document 7), a method of spraying in an empty circular cone-shape showing an annular shape or in an elliptic cone-shape showing a double convex lens-shape (Patent Document 8), and a method of spraying a liquid onto water-absorbing polymer particles using a spray nozzle (Patent Document 9).

PATENT DOCUMENTS

Patent Document 1: Japanese Patent Publication No. 49-43395
Patent Document 2: Japanese Laid-Open Patent Publication No. 51-125468
Patent Document 3: Japanese Laid-Open Patent Publication No. 52-14689
Patent Document 4: Japanese Laid-Open Patent Publication No. 62-172006
Patent Document 5: Japanese Laid-Open Patent Publication No. 57-158209
Patent Document 6: Japanese Laid-Open Patent Publication No. 57-21405
Patent Document 7: Japanese Laid-Open Patent Publication No. 4-246403
Patent Document 8: Japanese Laid-Open Patent Publication No. 2002-201290
Patent Document 9: International Patent Publication No. 2010-521578

SUMMARY OF THE INVENTION

Problems to be Solved by the Invention

A problem however arises that a product with constant physical properties is not always stably acquired with the methods and apparatuses each for producing the modified water-absorbing resin particles by adding the various types of liquid substance to the water-absorbing resin particles using the spray nozzle as above in a commercial plant or the like.

An object of this disclosure is to provide an apparatus for producing water-absorbing resin particles from which a product with further stable physical properties can be acquired, as an apparatus for producing water-absorbing resin particles by conducting surface cross-linking treatment, the treatment being conducted by spraying a surface cross-linking agent to a water-absorbing resin particle precursor and heating the agent and the precursor.

Means for Solving the Problems

An apparatus for producing water-absorbing resin particles according to an aspect of this disclosure is an apparatus for producing water-absorbing resin particles for which surface cross-linking treatment is conducted, the surface cross-linking treatment being conducted by spraying a surface cross-linking agent to a water-absorbing resin particle precursor and heating the agent and the precursor, the apparatus is configured to include a treatment container for the surface cross-linking treatment to be conducted therein, a stirring device that includes a stirring member disposed in the treatment container, a heating device that heats the inside of the treatment container, and a spray nozzle that is disposed in the treatment container and that sprays into the inside of the treatment container a surface cross-linking agent supplied from a surface cross-linking agent supply source in the exterior of the treatment container through a supply pipe, wherein, in a flow path in the spray nozzle spanning from an entrance of the spray nozzle to a spray exit, a point whose opening cross-section is smallest in a flow path through which a fluid passes is the spray exit.

Effect of the Invention

According to this disclosure, a product with further stable physical properties can be acquired using the apparatus for producing water-absorbing resin particles that conducts the surface cross-linking treatment.

BRIEF DESCRIPTION OF DRAWINGS

FIG. 2 is a configuration diagram of a treating apparatus of the embodiment.

Figure 1:
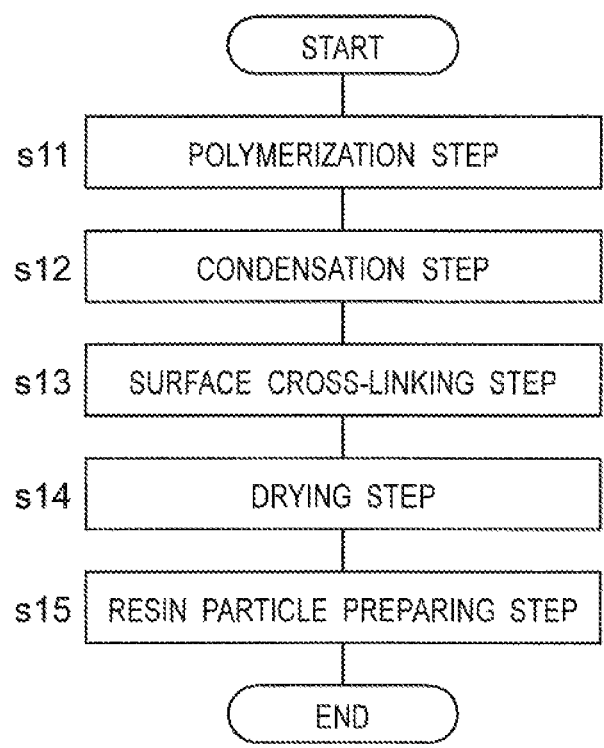
FIG. 1 is a flowchart of production steps for water-absorbing resin particles according to an embodiment of this disclosure.

EMBODIMENT(S) FOR CARRYING OUT THE INVENTION (Findings to be Basis of this Disclosure)

The inventors of this application intensively studied to solve the problem and, as a result, focused on a spray method for a surface cross-linking agent in their search for the cause of the fact that any product with constant physical properties was unable to stably be acquired. The findings found by the inventors of this application will be described as follows.

When a spray nozzle is used to spray a surface cross-linking agent, a strainer (a filter) is traditionally arranged in the spray nozzle to protect the spray nozzle, that is, to prevent any nozzle clogging.

On the other hand, when surface cross-linking treatment by mixing a surface cross-linking agent with a water-absorbing resin particle precursor and heating them is conducted, a trace of unreacted monomers remaining in the water-absorbing resin particle precursor vaporizes or the like and enters the inside of the spray nozzle to adhere to the strainer. When the heating is conducted in the surface cross-linking treatment, the heat is also transmitted to the strainer, polymerization of the adhering unreacted monomers is thereby advanced, and the spray nozzle is thereby blocked out. When drying treatment (or heating treatment) is further conducted to reduce the water amount still remaining in the water-absorbing resin particles after the surface cross-linking treatment, the heat is further transmitted to the strainer, polymerization of the adhering unreacted monomers is advanced, and the spray nozzle is blocked out. In the case where a reduced-pressure drying treatment is conducted as the drying treatment, when the pressure is recovered from the reduced-pressure state to the normal pressure, the unreacted monomers tend to enter the inside of the spray nozzle and the spray nozzle tends to be blocked out.

When this blocking out occurs in each of even some of the plural spray nozzles disposed in the apparatus for producing water-absorbing resin particles, the spray function for the surface cross-linking agent is degraded, and the water-absorbing resin particle precursor and the surface cross-linking agent cannot uniformly be mixed with each other. As a result, any product with constant physical properties cannot stably be acquired. The inventors found this fact and, based on this finding, completed this disclosure.

An apparatus for producing water-absorbing resin particles of a first aspect of this disclosure is an apparatus for producing water-absorbing resin particles for which surface cross-linking treatment is conducted, the surface cross-linking treatment being conducted by spraying a surface cross-linking agent to a water-absorbing resin particle precursor and heating the agent and the precursor, the apparatus includes a treatment container for the surface cross-linking treatment to be conducted therein, a stirring device that includes a stirring member disposed in the treatment container, a heating device that heats the inside of the treatment container, and a spray nozzle that is disposed in the treatment container and that sprays into the treatment container a surface cross-linking agent supplied from a surface cross-linking agent supply source in the exterior of the treatment container through a supply pipe, wherein the apparatus is configured such that, in a flow path in the spray nozzle spanning from an entrance of the spray nozzle to a spray exit, a point whose opening cross-section is smallest in a flow path through which a fluid passes is the spray exit.

According to this configuration, any fine-mesh member whose opening cross-section is finely divided such as a strainer and any portion having the flow path itself narrowed to be thin are not disposed in the course of the flow path that spans from the entrance of the spray nozzle to the spray exit. Occurrence of any clogging can thereby be suppressed in a portion of the flow path other than the spray exit of the spray nozzle even when the case occurs where, in the treatment container, a trace of unreacted monomers and the like remaining in the water-absorbing resin particle precursor enters from the spray exit of the spray nozzle during discontinuation of the spraying. When the surface cross-linking agent is sprayed, the spray exit of the spray nozzle has a relatively high spray pressure applied thereto compared to the other portion in the spray nozzle and any adhering object can be blown off.

An apparatus for producing water-absorbing resin particles of a second aspect of this disclosure is the apparatus for producing water-absorbing resin particles of the first aspect, wherein a strainer including plural openings each having an opening cross-section smaller than the opening cross-section of the spray exit of the spray nozzle is disposed in the supply pipe on the upstream side of the entrance of the spray nozzle.

According to this configuration, the strainer can prevent supply of any foreign object (that is, any foreign object that may clog the spray exit) to the spray nozzle through the supply pipe for the surface cross-linking agent. The strainer to protect the spray exit is disposed not in the spray nozzle but in the course of the supply pipe on the upstream side of the spray nozzle. Protection of the spray exit can thereby be facilitated by the strainer suppressing occurrence of any clogging in the spray nozzle by the entrance of the unreacted monomers and the like.

An apparatus for producing water-absorbing resin particles of a third aspect of this disclosure is the apparatus for producing water-absorbing resin particles of the second aspect, wherein the heating device is a heating jacket arranged on the outer circumference of the treatment container, and wherein the strainer is disposed in the supply pipe on the outer side of the heating jacket.

According to this configuration, in the supply pipe, the strainer is disposed in the portion thereof that tends to avoid any influence by the heat of the heating jacket. Protection of the spray exit can thereby be facilitated by the strainer suppressing occurrence of any clogging in the spray nozzle by the entrance of the unreacted monomers.

An apparatus for producing water-absorbing resin particles of a fourth aspect of this disclosure is the apparatus for producing water-absorbing resin particles of the second or the third aspect, wherein the supply pipe for the surface cross-linking agent includes a first pipe that is a header pipe having plural spray nozzles connected thereto and a second pipe that connects the surface cross-linking agent supply source and the first pipe to each other, wherein the first pipe and the plural spray nozzles are arranged inside the treatment container, and wherein the strainer is disposed in a portion on the outer side of the treatment container, of the second pipe.

According to this configuration, the strainer is disposed in the second pipe that tends to avoid any influence by the heat from the treatment container. Protection of the spray exit can thereby be facilitated by the strainer suppressing occurrence of any clogging in the spray nozzle by the entrance of the unreacted monomers.

An apparatus for producing water-absorbing resin particles of a fifth aspect of this disclosure is the apparatus for producing water-absorbing resin particles of any one of the second to the fourth aspects, further including a cooling device that cools the strainer.

According to this configuration, any thermal reaction for the unreacted monomers can be suppressed by the cooling of the strainer by the cooling device. Even when the case occurs where the unreacted monomers adhere to the strainer, advancement of any polymerization of the unreacted monomers can thereby be suppressed and occurrence of any clogging in the strainer can be suppressed.

EMBODIMENT

An embodiment according to this disclosure will be described below in detail with reference to the drawings while the scope of this disclosure is not bound by the description and, to items other than the following exemplification, proper changes can be made for implementation without discrediting the gist of this disclosure.

[Production Steps for Water-Absorbing Resin Particles]

FIG. 1 depicts a flowchart of production steps for water-absorbing resin particles according to an embodiment of this disclosure. As depicted in FIG. 1, the water-absorbing resin particles are prepared at a resin particle preparation step s15 that includes at least a polymerization step s11, a condensation step s12, a surface cross-linking step s13, and a drying step s14.

<Polymerization Step>

The polymerization step s11 is a step at which the water-absorbing resin particles are acquired by polymerization-reacting water-soluble ethylenic unsaturated monomers. The polymerization method for the water-soluble ethylenic unsaturated monomers is not especially limited, and an aqueous solution polymerization method, an emulsion polymerization method, a reverse phase suspension polymerization method, or the like is used that are typical polymerization methods.

In the aqueous solution polymerization method, the polymerization is conducted by, for example, heating a water solution of the water-soluble ethylenic unsaturated monomers, an internal cross-linking agent, and a water-soluble radical polymerization initiator, stirring these when necessary. In the aqueous solution polymerization method, water is handled as a liquid medium and the water-soluble ethylenic unsaturated monomers are established as a solution for the polymerization reaction to take place.

In the reverse phase suspension polymerization method, the polymerization is conducted by, for example, heating a water solution of the water-soluble ethylenic unsaturated monomers, a surfactant, a hydrophobic high molecule-based dispersion agent, a water-soluble radical polymerization initiator, and an internal cross-linking agent, stirring these in a petroleum-based hydrocarbon dispersion medium. In the reverse phase suspension polymerization method, water and the petroleum-based hydrocarbon dispersion medium are handled as the liquid media, and the polymerization reaction takes place with the water solution of the water-soluble ethylenic unsaturated monomers added to the petroleum-based hydrocarbon dispersion medium to be in a suspension state.

In the following, as an example of the embodiment of this disclosure, a method of producing the water-absorbing resin particles using the reverse phase suspension polymerization method will be described, that enables precise control of the polymerization reaction and control of the particle diameter in a wide range.

Examples of the water-soluble ethylenic unsaturated monomer used as the raw material of the water-absorbing resin particles include, for example, monomers each having an acid radical such as (meth)acrylic acid, 2-(meth)acrylamide-2-methylpropanesulfonic acid, maleic acid, and their salts; non-ionic unsaturated monomers such as (meth)acrylamide, N,N-dimethyl(meth)acrylamide, 2-hydroxyethyl (meth)acrylate, and N-methylol(meth)acrylamide; and amino-group-containing unsaturated monomers such as diethylaminoethyl(meth)acrylate, diethylaminopropyl (meth)acrylate and their quaternized products. Any one of these may be used alone, or two or more thereof may be used together. "(meth)acryl" means "acryl" and "methacryl".

Examples of the alkaline compound used when a monomer having an acid radical is neutralized to be a salt include compounds each of lithium, sodium, potassium, ammonium, and the like. Examples thereof include, for example, sodium hydroxide, potassium hydroxide, lithium hydroxide, sodium carbonate, and ammonium bicarbonate.

In this embodiment, the water-soluble ethylenic unsaturated monomers are used as a water solution. It is preferred that the monomer concentration of the water-soluble ethylenic unsaturated monomer water solution being 20% by mass to the saturation concentration.

The water-soluble ethylenic unsaturated monomer water solution may include, when necessary, a chain transfer agent, a thickener, and the like. Examples of the chain transfer agent include, for example, compounds such as thiols, thiol acids, secondary alcohols, hypophosphorous acid, and phosphorous acid. Any one of these may be used alone, or two or more thereof may be used together. Examples of the thickener include carboxymethyl cellulose, hydroxyethyl cellulose, hydroxypropyl cellulose, methyl cellulose, polyethylene glycol, polyacrylic acid, neutralized products of polyacrylic acid, polyacrylamide, and the like.

Examples of the petroleum-based hydrocarbon dispersion medium include, for example, aliphatic hydrocarbons each having 6 to 8 carbon atoms such as n-hexane, n-heptane, 2-methylhexane, 3-methylhexane, 2,3-dimethylpentane, 3-ethylpentane, and n-octane, alicyclic hydrocarbons such as cyclohexane, methylcyclohexane, cyclopentane, methylcyclopentane, trans-1,2-dimethylcyclopentane, cis-1,3-dimethylcyclopentane, and trans-1,3-dimethylcyclopentane, and aromatic hydrocarbons such as benzene, toluene, and xylene. Among these, from the viewpoints of industrially easy availability and the safety, those more advantageously used are the aliphatic hydrocarbons each having 6 to 8 carbon atoms such as n-hexane, n-heptane, 2-methylhexane, 3-methylhexane, and n-octane; and alicyclic hydrocarbons each having 6 to 8 carbon atoms such as cyclohexane, methylcyclopentane, and methylcyclohexane. Any one of these petroleum-based hydrocarbon dispersion media may be used alone, or two or more thereof may be used together.

In the reverse phase suspension polymerization, the water-soluble ethylenic unsaturated monomer water solution is dispersed in the petroleum-based hydrocarbon dispersion medium and, to acquire further stable polymerized particles, the surfactant and, when necessary, the hydrophobic high molecule-based dispersion agents are used. From the viewpoint that the polymerization is stably completed, when the surfactant and the hydrophobic high molecule-based dispersion agent can be caused to be present before the water-soluble ethylenic unsaturated monomer water solution is polymerized, the water-soluble ethylenic unsaturated monomer water solution can thereby be sufficiently dispersed in the petroleum-based hydrocarbon dispersion medium, and the liquid droplets thereof can be stabilized to thereafter conduct the polymerization, the timing to add each of the above is not especially limited. In general, the surfactant and the hydrophobic high molecule-based dispersion agent are solved or dispersed in advance in the petroleum-based hydrocarbon dispersion medium before the addition of the water-soluble ethylenic unsaturated monomer water solution.

Examples of the surfactant used to maintain the dispersion stability for the polymerization include, for example, non-ionic surfactants such as sorbitan fatty acid ester, polyoxyethylenesorbitan fatty acid ester, polyglycerin fatty acid ester, polyoxyethyleneglycerin fatty acid ester, sucrose fatty acid ester, sorbitol fatty acid ester, polyoxyethylenesorbitol fatty acid ester, polyoxyethylenealkyl ether, polyoxyethylenealkylphenyl ether, polyoxyethylene castor oil, polyoxyethylene hydrogenated castor oil, alkylallyl formaldehyde condensed polyoxyethylene ether, polyoxyethylenepolyoxypropylalkyl ether, polyethylene glycol fatty acid ester, alkylglucoside, N-alkylgluconamide, polyoxyethylene fatty acid amide, and polyoxyethylenealkylamine; and anionic surfactants such as fatty acid salts, alkylbenzenesulfonic acid salts, alkylmethyltaurine acid salts, polyoxyethylenealkylphenyl ether sulfate ester salts, polyoxyethylenealkyl ether sulfate ester salts, polyoxyethylenealkyl ether sulfate and its salts, polyoxyethylenealkylphenyl ether phosphoric acid and its salts, and polyoxyethylenealkyl ether phosphoric acid and its salts. Any one of these may be used alone, or two or more thereof may be used together.

The hydrophobic high molecule-based dispersion agent may be used together with the surfactant to further enhance the dispersion stability for the polymerization. It is preferred that the hydrophobic high molecule-based dispersion agent capable of being solved or dispersed in the used petroleum-based hydrocarbon dispersion medium be selected to be used, and examples thereof include, for example, those each having the viscosity-average molecular weight of 20,000 or smaller, preferably 10,000 or smaller, and further preferably 5,000 or smaller. Examples thereof include, for example, maleic acid anhydride-modified polyethylene, maleic acid anhydride-modified polypropylene, maleic acid anhydride-modified ethylene-propylene copolymer, maleic acid anhydride-ethylene copolymer, maleic acid anhydride-propylene copolymer, maleic acid anhydride-ethylene-propylene copolymer, polyethylene, polypropylene, ethylene-propylene copolymer, oxidized polyethylene, oxidized polypropylene, oxidized ethylene-propylene copolymer, ethylene-acrylic acid copolymer, ethylcellulose, polybutadiene maleic anhydride, ethylene-propylene-diene ternary copolymer (EPDM) maleic anhydride, and the like.

When the water-soluble ethylenic unsaturated monomer water solution is added to the petroleum-based hydrocarbon dispersion medium that fills in advance the polymerization reactor, to be dispersed therein, the dispersion is conducted with a stirring means while the conditions for the stirring with this stirring means differ depending on the desired dispersion liquid droplet diameter and cannot generally be determined. The dispersion liquid droplet diameter can be adjusted using the type, the blade diameter, and the number of rotations of the stirring blade of the stirring means and the like. For example, a propeller blade, a paddle blade, an anchor blade, a turbine blade, a pfaudler blade, a ribbon blade, a full-zone blade (manufactured by Kobelco Pantech Co., Ltd.), a Maxblend blade (manufactured by Sumitomo Heavy Industries, Ltd.), and SuperMix (manufactured by Satake Chemical Equipment Mfg., Ltd.) can be used as the stirring blade.

In the polymerization reactor, the water-soluble ethylenic unsaturated monomer water solution added at a predetermined addition rate to the petroleum-based hydrocarbon dispersion medium is fully stirred to be dispersed by the stirring means in the petroleum-based hydrocarbon dispersion medium in the presence of the surfactant to thereby stabilize the droplets. After the inside of the polymerization reactor is sufficiently substituted by nitrogen, reverse phase suspension polymerization is conducted using the water-soluble radical polymerization initiator in the presence of, when necessary, the internal cross-linking agent to acquire a suspension of a hydrogel cross-linked polymer (hereinafter, referred to as "water-absorbing resin particle precursor").

Examples of the water-soluble radical polymerization initiator used in this embodiment include, for example, persulfates such as potassium persulfate, ammonium persulfate, and sodium persulfate; peroxides such as hydrogen peroxide; and azo compounds such as 2,2'-azobis(2-amidinopropane) dihydrochloride, 2,2'-azobis[N-(2-carboxyethyl)-2-methylpropiondiamine] tetrahydrate, 2,2'-azobis(1-imino-1-pyrrolidino-2-methylpropane) dihydrochloride, and 2,2'-azobis[2-methyl-N-(2-hydroxyethyl)-propionamide].

The water-soluble radical polymerization initiator may be used as a redox polymerization initiator by being used together with a reducing agent such as a sulfite or ascorbic acid.

Examples of the internal cross-linking agent used when necessary include, for example, polyols such as (poly) ethylene glycol ["(poly)" means the case where the prefix "poly" is present and the case the prefix is absent, and the same is hereinafter applied], 1,4-butanediol, glycerin, and trimethylolpropane, polyunsaturated esters each having two or more vinyl groups and each acquired by reacting a polyol and an unsaturated acid such as acrylic acid or methacrylic acid, bisacrylamides such as N,N'-methylenebisacrylamide, and polyglycidyl compounds each having two or more glycidyl groups such as (poly)ethyleneglycoldiglycidyl ether, (poly)ethyleneglycoltriglycidyl ether, (poly)glycerindiglycidyl ether, (poly)glycerintriglycidyl ether, (poly)propyleneglycolpolyglycidyl ether, and (poly)glycerolpolyglycidyl ether. Any one of these may be used alone, or two or more thereof may be used together.

The reaction temperature for the reverse phase suspension polymerization in the polymerization reactor differs depending on the type and the amount of the used polymerization initiator and cannot generally be determined while the reaction temperature is preferably 30 to 120° C. and more preferably 40 to 100° C. The reaction temperature is 30° C. or higher and any reduction of the polymerization rate can thereby be suppressed. The reaction temperature is 120° C. or lower and occurrence of any abrupt polymerization reaction can thereby be suppressed.

The polymerization reaction liquid including the water-absorbing resin particle precursor, acquired as above (the suspension liquid of the water-absorbing resin particle precursor) is polymerized as a "first-stage polymerization", and "multi-stage polymerization" of repeating polymerization for some times each by adding the water-soluble ethylenic unsaturated monomer water solution may thereafter be conducted.

From the viewpoint of acquisition of a proper agglomeration particle diameter in the multi-stage polymerization, the size of the particle acquired by the polymerization of the water-soluble ethylenic unsaturated monomers in the first-stage is, as the median particle diameter, preferably 20 to 200 µm, more preferably 30 to 150 µm, and further preferably 40 to 120 µm.

When two-stage polymerization is conducted, the particles acquired in the first-stage polymerization are agglomerated and water-absorbing resin particles can thereby be acquired whose average particle diameter is relatively large and that are suitable for use for a sanitary material. The size of the agglomeration particle of the water-absorbing resin particles advantageous for the use for a sanitary material is preferably 200 to 600 µm, further preferably 250 to 500 µm, and most preferably 300 to 450 µm.

The water-soluble ethylenic unsaturated monomer same as any of those exemplified as the water-soluble ethylenic unsaturated monomer for the first-stage polymerization is usable as the water-soluble ethylenic unsaturated monomer for the second-stage polymerization while the type of the monomer, the degree of neutralization, the neutralized salt, and the concentration of the monomer water solution may be same/equal as/to those of the water-soluble ethylenic unsaturated monomer for the first-stage polymerization or may be different therefrom.

Any polymerization initiator is usable that is selected from those exemplified for the water-soluble ethylenic unsaturated monomer water solution for the first-stage polymerization as the polymerization initiator added to the water-soluble ethylenic unsaturated monomer water solution in the second-stage polymerization.

The internal cross-linking agent, the chain transfer agent, and the like may be added when necessary to the water-soluble ethylenic unsaturated monomer water solution for the second-stage polymerization, and any internal cross-linking agent, any chain transfer agent, and the like are usable that are selected from those exemplified for the water-soluble ethylenic unsaturated monomer water solution for the first-stage polymerization.

The reaction temperature for the reverse phase suspension polymerization in the second stage also differs depending on the type and the amount of the polymerization initiator and cannot generally be determined while the reaction temperature is preferably 30 to 120° C. and more preferably 40 to 100° C. When the multi-stage polymerization in two or more stages is conducted, the multi-stage polymerization can be conducted by hereinafter reading "the second-stage polymerization" as the third-stage polymerization or the fourth-stage polymerization.

<Condensation Step>

The condensation step s12 is the step of condensing the polymerization reaction liquid that is acquired at the polymerization step s11 by distilling away the liquid component from the polymerization reaction liquid to acquire the water-absorbing resin particle precursor.

The distilling treatment for the liquid component from the polymerization reaction liquid at the condensation step s12 may be conducted under the normal pressure or a reduced pressure, or may be conducted in a flow of a gas such as nitrogen to increase the efficiency of the distilling of the liquid component.

When the distilling treatment for the liquid component from the polymerization reaction liquid is conducted at the normal pressure, the set temperature for the condensation is preferably 70 to 250° C., more preferably 80 to 180° C., further preferably 80 to 140° C., and most preferably 90 to 130° C. When the distilling treatment for the liquid component from the polymerization reaction liquid is conducted at a reduced pressure, the set temperature for the condensation is preferably 60 to 100° C. and more preferably 70 to 90° C.

<Surface Cross-Linking Step>

The surface cross-linking step s13 is the step of adding the surface cross-linking agent having two or more functional groups each having the reactive property for a functional group derived from the water-soluble ethylenic unsaturated monomer, to the water-soluble resin particle precursor acquired after the distilling treatment for the liquid component from the polymerization reaction liquid, and thereby increasing the cross-link density in the surface layer of the water-soluble resin particle precursor to acquire the water-soluble resin particles. The water-soluble resin particles whose surface layers each having the high cross-link density have various types of high performance such as the absorption capacity under load, the water-absorbing rate, and the gel strength, and have advantageous performance for the use for a sanitary material.

The surface cross-linking agent used in the cross-linking reaction is not especially limited only when the surface cross-linking agent can react with a functional group that is derived from the water-soluble ethylenic unsaturated monomer used in the polymerization.

Examples of the used surface cross-linking agent include, for example, polyols such as ethylene glycol, propylene glycol, 1,4-butanediol, trimethylolpropane, glycerin, polyoxyethylene glycol, polyoxypropylene glycol, and polyglycerin; polyglycidyl compounds such as (poly)ethyleneglycoldiglycidyl ether, (poly)ethyleneglycoltriglycidyl ether, (poly)glycerindiglycidyl ether, (poly)glycerintriglycidyl ether, (poly)propyleneglycolpolyglycidyl ether, and glycerolpolyglycidyl ether; haloepoxy compounds such as epichlorohydrin, epibromohydrin, and α-methylepichlorohydrin, compounds each having two or more reactive functional groups such as isocyanate compounds such as 2,4-tolylenediisocyanate and hexamethylenediisocyanate; oxetane compounds such as 3-methyl-3-oxetanem ethanol, 3-ethyl-3-oxetanem ethanol, 3-butyl-3-oxetanem ethanol, 3-methyl-3-oxetaneethanol, 3-ethyl-3-oxetaneethanol, and 3-butyl-3-oxetaneethanol, oxazoline compounds such as 1,2-ethylenebisoxazoline, and carbonate compounds such as ethylene carbonate. Any one of these may be used alone, or two or more thereof may be used together.

Among these, from the viewpoint of excellent reactivity, the polyglycidyl compounds are advantageously used such as (poly)ethyleneglycoldiglycidyl ether, (poly)ethyleneglycoltriglycidyl ether, (poly)glycerindiglycidyl ether, (poly)glycerintriglycidyl ether, (poly)propyleneglycolpolyglycidyl ether, and (poly)glycerolpolyglycidyl ether.

The addition amount of the surface cross-linking agent is preferably 0.01 to 5 parts by mass and more preferably 0.02 to 3 parts by mass relative to 100 parts by mass of the total amount of the water-soluble ethylenic unsaturated monomers supplied in the polymerization. The addition amount of the surface cross-linking agent is 0.01 part by mass or larger and the absorption capacity under load, the water-absorbing rate, the gel strength, and the like of the acquired water-absorbing resin can thereby be enhanced. The addition amount is 5 parts by mass or smaller, and excessive degradation of the water-absorbing performance can thereby be suppressed.

The surface cross-linking agent may be added as it is or may be added as a water solution as the addition method for the surface cross-linking agent or, when necessary, may be added as a solution using a hydrophilic organic solvent as the solvent. Examples of the hydrophilic organic solvent include, for example, lower alcohols such as methyl alcohol, ethyl alcohol, n-propyl alcohol, isopropyl alcohol, and propylene glycol, ketones such as acetone and methylethylketone, ethers such as diethyl ether, dioxane, and tetrahydrofuran, amides such as N,N-dimethylformaldehyde, and sulfoxides such as dimethylsulfoxide. Any one of these hydrophilic organic solvents may be used alone, or two or more thereof may be used together.

The surface cross-linking reaction is preferably conducted in the presence of water in a range of 1 to 200 parts by mass, further preferably conducted in the presence of water in a range of 5 to 100 parts by mass, and further more preferably conducted in the presence of water of 10 to 50 parts by mass relative to 100 parts by mass of the water-absorbing resin during the distilling treatment of the liquid component from the polymerization reaction liquid. The surface cross-linking in the surface layer of each of the particles of the water-absorbing resin can more advantageously be conducted and excellent water-absorbing performance can be developed by adjusting the water amount during the addition of the surface cross-liking agent as above.

The temperature for the surface cross-linking reaction is preferably 50 to 250° C., more preferably 60 to 180° C., further preferably 60 to 140° C., and most preferably 70 to 120° C.

The water-absorbing resin particles acquired after undergoing the polymerization step s11, the condensation step s12, and the surface cross-linking step s13 as above are usually in a hydrogel state. The drying treatment may be conducted after the surface cross-linking step s13 when necessary, to reduce the water rate of the water-absorbing resin particles.

<Drying Step>

The case will be described where the drying step is conducted after the surface cross-linking step s13. The drying step s14 is the step of drying the water-absorbing resin particles in the hydrogel state that is acquired at the surface cross-linking step s13.

Various types of method can be employed as the drying treatment method conducted at the drying step S14 such as a drying by heating, hot air drying, reduced pressure drying, IR ray drying, microwave drying, dewatering by azeotropy with a hydrophobic organic solvent, and high humidity drying using high temperature steam, to establish the aimed water content ratio, and the drying treatment method is not especially limited. When the drying treatment is conducted by hot air drying, the drying treatment is conducted at a temperature (the temperature of the hot air) in a range of usually 60 to 250° C., preferably 100 to 220° C., and more preferably 120 to 200° C. The drying time period is dependent on the surface area and the water content ratio of the polymer, and the type of the drying machine and is selected to establish the aimed water content ratio. For example, the drying time period is properly selected in a range of 1 minute to 5 hours. When the reduced pressure drying is conducted, the drying treatment is conducted at a vacuum pressure (the absolute pressure) in a range of preferably 5 to 90 kPa and more preferably 10 to 60 kPa.

The water content ratio of the water-absorbing resin particles usable for this disclosure is preferably 20% by mass or lower and more preferably 10% by mass or lower. Excellent fluidity of the water-absorbing resin particles can be maintained by setting the water content ratio of the water-absorbing resin particles to be 20% by mass or lower.

The surface cross-linking step s13 and the drying step s14 can be conducted using the apparatus for producing water-absorbing resin particles of this disclosure. The configuration of a treating apparatus 1 will be described that is an example of the apparatus for producing water-absorbing resin particles according to an embodiment of this disclosure, with reference to the drawings. FIG. 2 is a schematic configuration diagram of the main configuration of the treating apparatus 1 of this embodiment.

As depicted in FIG. 2, the treating apparatus 1 includes a treatment container 10, a stirring device 20, and a heating device 30. The treating apparatus 1 may employ, for example, a conduction heat-transmitting stirring and drying device.

The treatment container 10 is a horizontal drum container that accommodates the water-absorbing resin particle precursor and the water-absorbing resin particles, and is structured to have heat resistance and airtightness. An input entrance 11 for the water-absorbing resin particle precursor is disposed in the upper portion of the treatment container 10, and the input entrance 11 is connected to a supply line (such as, for example, a pipe path) for the water-absorbing resin particle precursor. A discharge exit 12 for the water-absorbing resin particles for which the surface cross-linking step and the drying step are conducted is disposed in the lower side portion of the treatment container 10, and the discharge exit 12 is connected to a discharge line (such as, for example, a pipe path) for the water-absorbing resin particles. An opening and closing mechanism (not depicted) such as a valve to open or close the line is disposed in each of the supply line in the vicinity of the input entrance 11 and the discharge line in the vicinity of the discharge exit 12.

The stirring device 20 includes plural stirring boards 21 arranged in the treatment container 10, a rotational shaft 22 to which the plural stirring boards 21 are attached, and a rotation driving device 23 to drive and rotate the rotational shaft 22.

The rotational shaft 22 is arranged in the treatment container 10 to extend in the horizontal direction (the longitudinal direction) of the treatment container 10 that is the horizontal drum container, and fixes each of the stirring boards 21 to be lined in the horizontal direction. The stirring boards 21 each have a substantially disc shape, and vanes or the like may be disposed on each of the stirring boards 21 as the members to enhance the stirring function for the water-absorbing resin particles and the like. The rotation driving device 23 is arranged on the outer side of the treatment container 10, rotates the rotational shaft 22, and thereby rotates the stirring boards 21. The rotation driving device 23 may be adapted to rotate the rotational shaft not only in the forward direction but also the reverse direction, and may be adapted to vary the number of rotations of the rotational shaft.

The heating device 30 includes a heat transmitting part 31 that is arranged in the inside of each of the rotational shaft 22 and the stirring boards 21 of the stirring device 20, and a heating jacket 32 arranged on the outer circumference face of the outer shell of the treatment container 10.

The heat transmitting part 31 includes a steam flow path that is formed in the inside of the rotational shaft 22 and each of the stirring boards 21. Steam is supplied to the heat transmitting part 31 through a steam line (a pipe path) that is connected to an end portion of the rotational shaft 22, and heats the water-absorbing resin particles and the like accommodated in the treatment container 10 through the outer surface of each of the stirring boards 21.

The heating jacket 32 includes the steam flow path (a heat exchanger) arranged to surround the outer surface of the outer shell of the treatment container 10. The steam line is connected to the heating jacket 32, and the supplied steam heats the water-absorbing resin particle precursor or the water-absorbing resin particles and the like that are accommodated in the treatment container 10, through the outer shell of the treatment container 10.

A control configuration (such as a steam flow adjusting valve and a temperature sensor: not depicted) conducting the control of the supply amount of the steam to the heat transmitting part 31 and the heating jacket 32 is disposed, and the control by the control configuration is conducted to establish the required heating temperature.

A spray device 40 spraying the surface cross-linking agent is disposed in the upper portion in the treatment container 10. The spray device 40 sprays the surface cross-linking agent supplied from the surface cross-linking agent supply source disposed outside the treatment container 10 through a supply line (a supply pipe) 41, into the treatment container 10. The spray device 40 includes plural spray nozzles 42, a first pipe 43 to be the header pipe to which the plural spray nozzles 42 are connected, and a second pipe 44 that connects the surface cross-linking agent supply source and the first pipe 43 to each other.

In this embodiment, the surface cross-linking agent supply source includes a tank 2 that accommodates the surface cross-linking agent, and a pump 3 that supplies the surface cross-linking agent in the tank 2 to the supply line 41. In this embodiment, the second pipe 44 is a pipe path spanning from the exit of the pump 3 to the connection portion to the first pipe 43 that is the header pipe.

In the spray device 40, each of the spray nozzles 42 and the first pipe 43 are arranged inside the treatment container 10, and the second pipe 44 includes a portion that penetrates the outer shell of the treatment container 10 and the heating jacket 32. The case where the two spray devices 40 are disposed is exemplified by the treating apparatus 1 depicted in FIG. 2 while the number of the installed spray devices 40 is not limited.

A pure water supply line 4 and a nitrogen supply line 5 are connected to the supply line 41 for the surface cross-linking agent, and the surface cross-linking agent, pure water, and nitrogen can thereby be selectively supplied into the treatment container 10 through the supply line 41. A valve opening or closing the line is properly disposed in the supply line 41.

In the treating apparatus 1 of this embodiment, a strainer 45 is disposed in the outer side portion of the treatment container 10, of the second pipe 44 of the supply line 41 for the surface cross-linking agent (that is, the outer shell of the treatment container 10 and the outer side portion of the heating jacket 32). The strainer 45 has a function of capturing any foreign object by filtering the fluid that passes therethrough to avoid supplying of any foreign object to the spray nozzles 42 (any foreign object that may clog the spray exit of each of the spray nozzles 42). Various types of strainer may be employed as the strainer 45 and, for example, a Y-shaped strainer may be employed. For example, a metal mesh filter (not depicted) is disposed in the strainer 45 as the filter for filtering any foreign object. The individual mesh opening cross-section (the opening area) of the metal mesh filter is set to be smaller than the opening cross-section (the opening area) of the spray exit of the spray nozzle 42.

The method of conducting the surface cross-linking step s13 and the drying step s14 using the treating apparatus 1 of this embodiment having this configuration will be described.

The water-absorbing resin particle precursor acquired at the condensation step is input from the input entrance 11 of the treating apparatus 1 into the inside of the treatment container 10. The input water-absorbing resin particle precursor is stirred by the stirring device 20 that includes the plural stirring boards 21 disposed in the treatment container 10. In accordance with the drying state of the water-absorbing resin particle precursor acquired at the condensation step, the inside of the treatment container 10 is heated by the heating device 30 (the heat transmitting part 31 and the heating jacket 32) and the water amount of the water-absorbing resin particle precursor is thereby adjusted.

Subsequently, the solution of the surface cross-linking agent is sprayed through the spray nozzles 42 to the water-absorbing resin particle precursor whose water amount is adjusted to be suitable for conducting the surface cross-linking treatment. For example, the solution of the surface cross-linking agent is supplied from the tank 2 that accommodates the solution of the surface cross-linking agent to the supply line 41 by the pump 3, and the solution of the surface cross-linking agent is sprayed from each of the spray nozzles 42 through the second pipe 44 and the first pipe 43. During this spraying, the spraying is conducted stirring the water-absorbing resin particle precursor using the stirring device 20 for the solution of the surface cross-linking agent to uniformly be supplied to the overall water-absorbing resin particle precursor. When the surface cross-linking treatment is conducted using the treating apparatus 1 of this embodiment, the surface cross-linking agent solution is a water solution from the viewpoints of the easiness of handling and the safety.

After the surface cross-linking agent solution is sprayed to the water-absorbing resin particle precursor for a predetermined time period, the spraying by the spray nozzles 42 is discontinued. It is preferred that, after the spraying is discontinued, a gas such as air, nitrogen, or the like be sprayed to remove the surface cross-linking agent solution remaining at the tip of each of the spray nozzles 42. In this embodiment, the remaining solution is removed by supplying nitrogen to the spray nozzles 42 through the nitrogen supply line 5 and the supply line 41.

The inside of the treatment container 10 is thereafter heated by the heating device 30 (the heat transmitting part 31 and the heating jacket 32) and the surface cross-linking reaction of the water-absorbing resin particle precursor is thereby facilitated to conduct the surface cross-linking treatment. The water-absorbing resin particles acquired by undergoing this surface cross-linking treatment are usually in the hydrogel state.

Subsequently, in this embodiment, the drying treatment is continuously conducted in the same treatment container 10 to dry the water-absorbing resin particles in the hydrogel state.

In the drying treatment, the water-absorbing resin particles are dried at the normal pressure or a reduced pressure stirring the water-absorbing resin particles using the stirring device 20. The drying is desirably conducted by reducing the pressure in the treatment container 10 using a decompressing device (not depicted) to suppress or prevent any adverse influence on the water-absorbing resin particles by the thermal history. For example, a vacuum pump may be used as the decompressing device. The water-absorbing resin particles whose water content ratio is adjusted to be the desired one by the drying treatment are discharged from the discharge exit 12 of the treating apparatus 1 to the exterior of the treatment container 10 (that is, the discharge line).

The discharged water-absorbing resin particles further undergo the resin particle preparation step s15 of preparing the water-absorbing resin particles when desired, and are packed. The resin particle preparation step s15 may include, for example, a crushing step, a classification step, and a mixing step.

When the water-absorbing resin particles are produced using the aqueous solution polymerization method, the hydrogel acquired by the polymerization is dried and the crushing treatment and the classification treatment are conducted for the dried substance to acquire the amorphous water-absorbing resin particle precursor.

The amorphous water-absorbing resin particle precursor acquired as above is input into the treatment container 10 of the treating apparatus 1, the same treatments as above are conducted therefor, and the water-absorbing resin particles can be acquired.

The configuration of the spray nozzle 42 included by the treating apparatus 1 of this embodiment will be described with reference to a cross-sectional diagram of an assembly state depicted in FIG. 3A and an exploded cross-sectional diagram depicted in FIG. 3B. The configuration of a spray nozzle 142 according to a comparative embodiment to be compared with the spray nozzle 42 of this embodiment will be described with reference to a cross-sectional diagram of an assembly state depicted in FIG. 4A and an exploded cross-sectional diagram depicted in FIG. 4B.

Figure 3A:
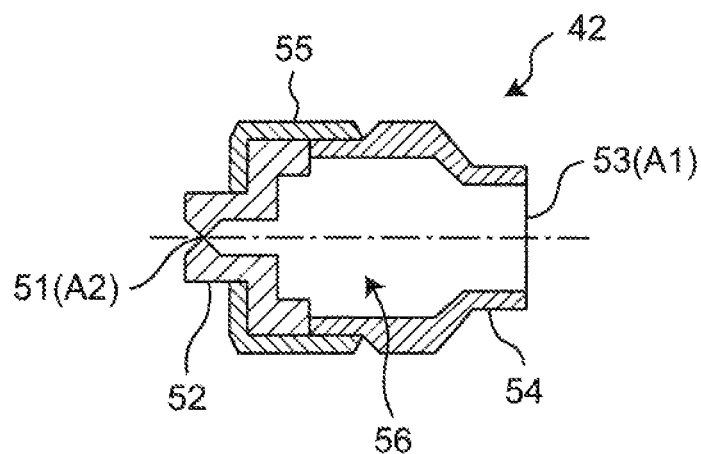
FIG. 3A is a cross-sectional diagram of an assembly state of a spray nozzle included in the treating apparatus of the embodiment.
Figure 3B:
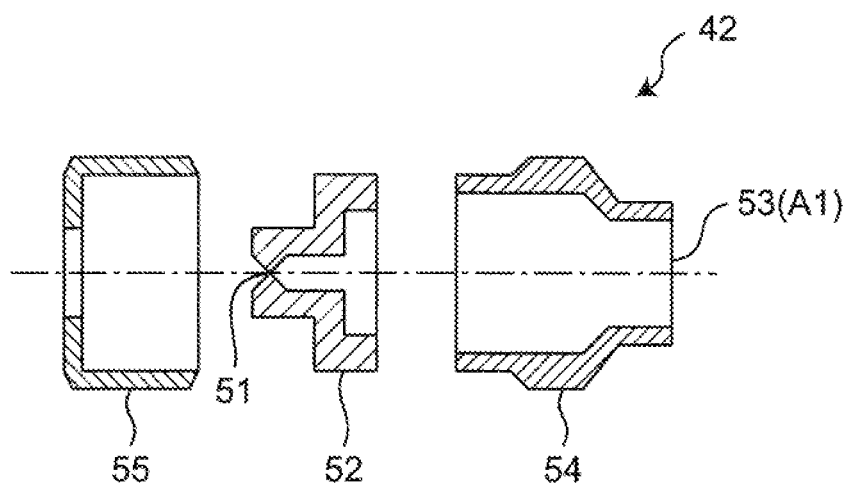
FIG. 3B is an exploded cross-sectional diagram of the spray nozzle included in the treating apparatus of the embodiment.

As depicted in FIG. 3A and FIG. 3B, the spray nozzle 42 of this embodiment includes a chip part 52 that includes a spray exit 51 at its tip, a main body part 54 that includes on its one end an entrance 53 connected to the first pipe 43, and a cap part 55 that couples the chip part 52 and the main body part 54 with each other.

For example, a thread portion is disposed on the outer circumference of the entrance 53 of the main body part 54, and is detachably thread-connected to the first pipe 43. The entrance 53 of the main body part 54 has a bore equal to, for example, that of the connection portion of the first pipe 43 connected thereto. In the main body part 54, the portion having the smallest opening cross-section is the entrance 53 (an opening cross-section A1).

The end portion of the chip part 52 is connected to the other end of the main body part 54. The chip part 52 has the opening cross-section that becomes smaller as the position of the opening cross-section becomes closer to the spray exit 51 at the tip. An opening cross-section A2 of the spray exit 51 is set in accordance with the specification of the fluid to be sprayed therethrough while the opening cross-section A2 is the smallest opening cross-section in the chip part 52. Various forms may be employed as the shape of the spray exit 51 and, for example, the opening shape having a circular cross-section or an ellipsoidal cross-section may be employed.

The cap part 55 maintains the coupling state between the chip part 52 and the main body part 54 by engaging (such as, for example, thread-engaging) with the chip part 52 and the main body part 54 from the outer circumference side to extend over the connection portion therebetween.

In the spray nozzle 42 of this embodiment, a flow path 56 in the spray nozzle spanning from the entrance 53 to the spray exit 51 is formed on the inner side of the chip part 52 and the main body part 54. The opening cross-section A2 of the spray exit 51 is set to be smaller than the opening cross-section A1 of the entrance 53. Accordingly, in the flow path 56 in the nozzle, the point at which the opening cross-section is smallest in the flow path through which the surface cross-linking agent solution to be a liquid passes is the spray exit 51.

Figure 4A:
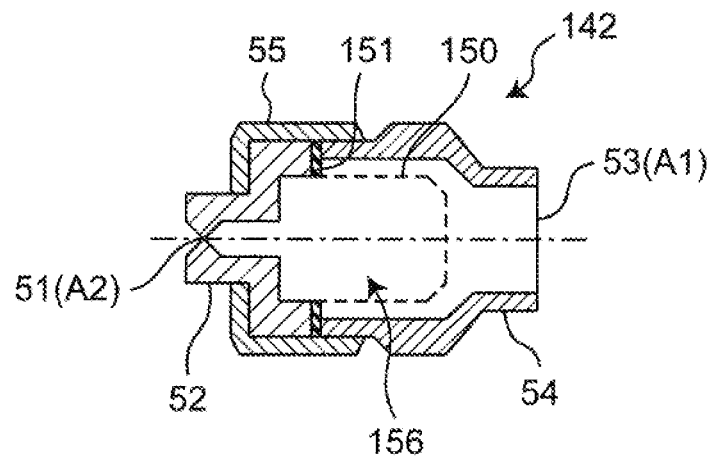
FIG. 4A is a cross-sectional diagram of an assembly state of a spray nozzle of a comparative embodiment.
Figure 4B:
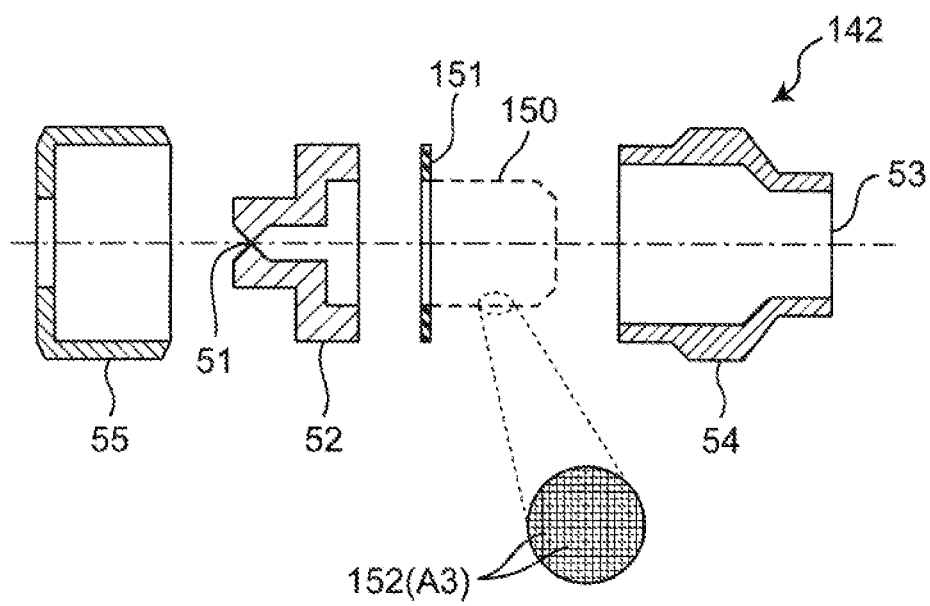
FIG. 4B is an exploded cross-sectional diagram of the spray nozzle of the comparative embodiment.

On the other hand, as depicted in FIG. 4A and FIG. 4B, the spray nozzle 142 of the comparative embodiment includes the chip part 52, the main body part 54, and the cap part 55. The chip part 52, the main body part 54, and the cap part 55 are the same components as the components included by the spray nozzle 42 of this embodiment.

The spray nozzle 142 includes a strainer 150. The strainer 150 is disposed aiming at removing any foreign object that may clog the spray exit 51. For example, a metal mesh filter is used as the strainer 150. An opening cross-section A3 (an opening area) of an individual mesh opening 152 of the metal mesh filter is set to be smaller than the opening cross-section A2 (the opening area) of the spray exit 51 of the spray nozzle 42. The strainer 150 is attached to be sandwiched between the chip part 52 and the main body part 54 in a flange portion 151.

In the spray nozzle 142 of the comparative embodiment having the above configuration, in a flow path 156 in the spray nozzle spanning from the entrance 53 to the spray exit 51, the point at which the opening cross-section becomes smallest in the flow path through which the surface cross-linking agent solution passes is not the spray exit 51 but the individual mesh opening 152 of the strainer 150.

In this specification, the expression "in a flow path in the spray nozzle spanning from the entrance of the spray nozzle to the spray exit, the point at which the opening area becomes smallest in the flow path through which the fluid passes is the spray exit" refers to the fact that, in the flow path in the spray nozzle, any opening cross-section smaller than the opening cross-section of the spray exit is not disposed. When the flow path is sectioned into plural openings, the opening cross-section of the flow path is the opening cross-section of the individual sectioned opening. For example, when the metal mesh filter is disposed in the flow path, the opening cross-section of one mesh opening of the metal mesh filter is the opening cross-section of the flow path.

When the surface cross-linking treatment and the drying treatment are conducted using the treating apparatus (the apparatus for producing water-absorbing resin particles) including the spray nozzles 142 of the comparative embodiment, the unreacted monomers remaining in the water-absorbing resin particles vaporizes and enters the inside of the spray nozzle 142. The entering unreacted monomers adhere to the mesh opening 152 of the strainer 150 whose opening cross section is smallest in the flow path 156 in the nozzle. When the surface cross-linking treatment and the drying treatment are conducted, the heat is also transmitted to the strainer 150 and the adhering unreacted monomers are polymerized to cause blocking out of the mesh opening of the strainer 150 to occur. When this blocking out grows, blocking out of the spray nozzle 142 itself occurs over time.

When this blocking out occurs in each of even some of the plural spray nozzles disposed in the treating apparatus, the spray function for the surface cross-linking agent is degraded and the water-absorbing resin particle precursor and the surface cross-linking agent cannot be uniformly mixed with each other.

In contrast, the spray nozzle 42 of this embodiment has no strainer disposed therein and, in the flow path 56 in the nozzle, the point whose opening cross-section is smallest is the spray exit 51. The spray nozzle 42 is therefore configured such that any member having fine meshes formed by finely dividing the opening cross-section such as a strainer and any portion of the flow path itself that is narrowed to be thin are not disposed in the course of the flow path 56 in the nozzle spanning from the entrance 53 of the spray nozzle 42 to the spray exit 51. In the case where the spraying is discontinued, occurrence of any clogging can thereby be suppressed in a portion of the flow path other than the spray exit 51 of the spray nozzle 42 even when the unreacted monomers and the like remaining in the water-absorbing resin particles enter from the spray exit 51 of the spray nozzle 42 in the treatment container. When the surface cross-linking agent solution is sprayed, a spray pressure relatively high compared to those of other portions in the spray nozzle 42 is applied to the spray exit 51 of the spray nozzle 42 and any adhering object can therefore be blown off.

A product with further stable physical properties can be acquired using the treating apparatus 1 that conducts the surface cross-linking treatment and the drying treatment for the water-absorbing resin particles and the like.

The strainer 45 including plural openings (the individual mesh openings) each having the opening cross-section that is smaller than the opening cross-section A2 of the spray exit 51 of the spray nozzle 42 is disposed in the supply line 41 on the upstream side of the entrance 53 of the spray nozzle 42. According to this configuration, the strainer 45 can prevent supply of any foreign object (that is, any foreign object that may clog the spray exit 51) through the supply line 41 for the surface cross-linking agent solution. The strainer 45 for the protection of the spray exit 51 is disposed in not the spray nozzle 42 but in the course of the supply line 41 on the upstream side of the spray nozzle 42. Protection of the spray exit 51 by the strainer 45 can thereby be facilitated suppressing occurrence of any clogging in the spray nozzle 42 by the entrance of the unreacted monomers.

The strainer 45 is disposed in the supply line 41 arranged on the outer side of the outer shell of the treatment container 10 and the heating jacket 32. According to this configuration, the strainer 45 is disposed in the portion that tends to avoid any influence by the heat of the heating jacket 32, of the supply line 41. Protection of the spray exit 51 by the strainer 45 can thereby be facilitated suppressing occurrence of any clogging in the spray nozzle 42 by the entrance of the unreacted monomers. The case where the strainer 45 is disposed on the downstream side of the pump 3 is taken as the example for the treating apparatus 1 of this embodiment while the strainer may be disposed on the upstream side of the pump 3.

For example, the opening cross-section A2 of the spray exit 51 of the spray nozzle 42 is 0.4 mm² and the opening cross-section A1 of the entrance 53 of the spray nozzle 42 is 52.8 mm². For example, the opening cross-section A3 of the individual mesh opening 152 of the metal mesh filter to be the strainer 150 of the spray nozzle 142 is 0.02 mm².

Figure 5:
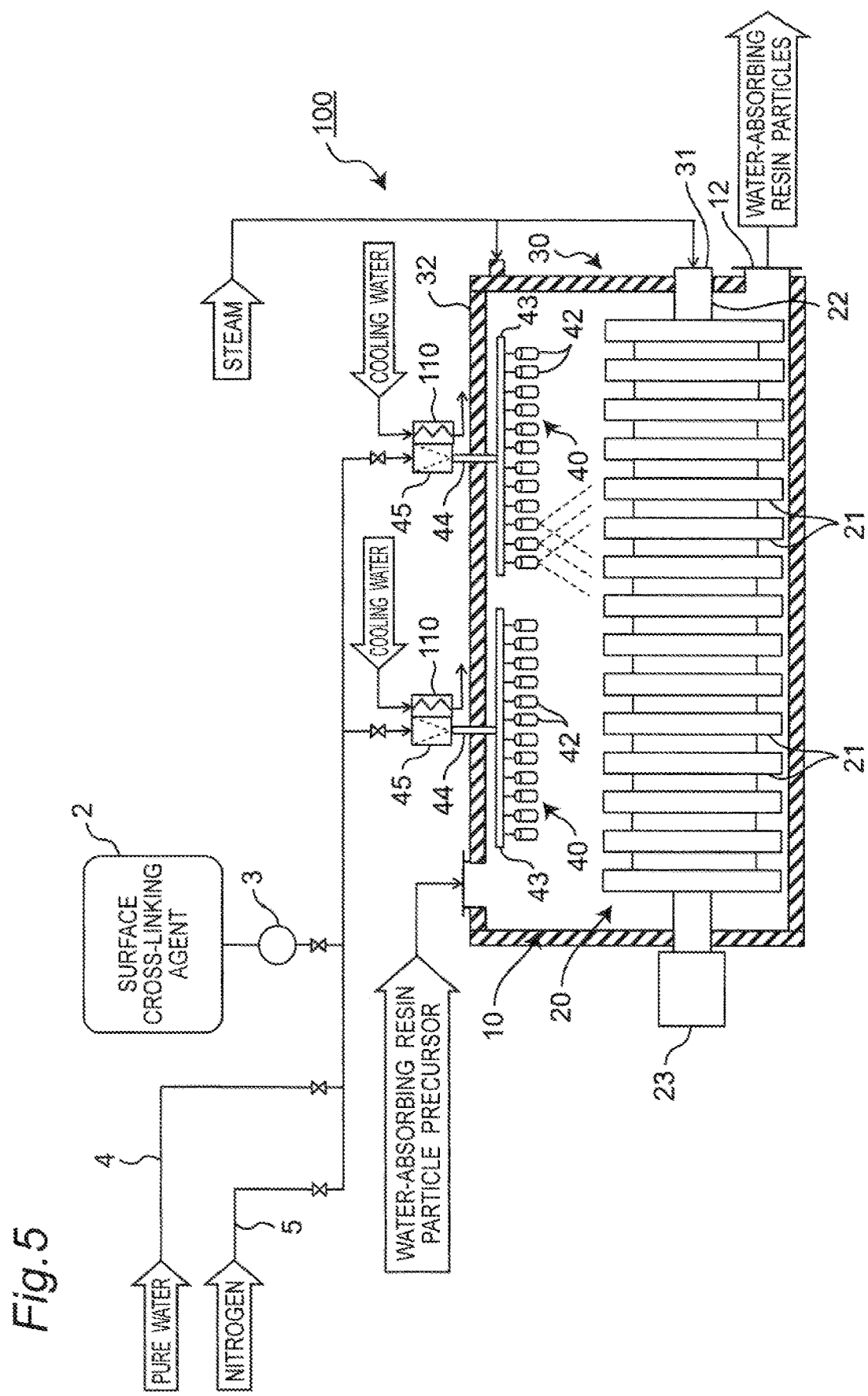
FIG. 5 is a configuration diagram of a treating apparatus according to a modification example of the embodiment.

FIG. 5 depicts a configuration diagram of a treating apparatus 100 that is an example of the apparatus of producing the water-absorbing resin particles according to a modification example of this embodiment. For the treating apparatus 100 of the modification example depicted in FIG. 5, the components same as those of the treating apparatus 1 of the embodiment are given the same reference numerals and will not again be described. The difference of the treating apparatus 100 of this modification example from the treating apparatus 1 of the embodiment will be described.

As depicted in FIG. 5, in the treating apparatus 100, the strainer 45 is disposed corresponding to each of the spray devices 40, in the outer side portion of the treatment container 10, of the second pipe 44 of the spray device 40. A cooling device 110 cooling the strainer 45 is disposed to be in contact with each of the strainers 45. The cooling device 110 is a heat exchanger that includes the flow path for cooling water and is connected to the supply line for cooling water.

According to this configuration, the strainer 45 is disposed in the second pipe 44 that is the portion tending to avoid any influence by the heat from the treatment container 10. Protection of the spray exit 51 by the strainer 45 can thereby be facilitated suppressing occurrence of any clogging in the spray nozzle 42 by the entrance of the unreacted monomers. Any thermal reaction for the unreacted monomers can be suppressed by the cooling of the strainer 45 by the cooing device 110. Even when the unreacted monomers adhere to the strainer 45, advancement of any polymerization of the unreacted monomers can thereby be suppressed and occurrence of any clogging in the strainer 45 can thereby be suppressed.

The case where the surface cross-linking treatment and the drying treatment are conducted for the water-absorbing resin particle precursor in each of the treating apparatuses 1 and 100 that each are an example of the apparatus for producing water-absorbing resin particles is taken as the example in the description for the above embodiment while the apparatus for producing water-absorbing resin particles of this disclosure is applicable also to the case where only the surface cross-linking treatment is conducted by the apparatus for producing water-absorbing resin particles.

EXAMPLES

This disclosure will be described in detail below with reference to Examples of this disclosure while this disclosure is not limited at all to Examples below.

[Production Method for Water-Absorbing Resin Particle Precursor]

<Polymerization Step>

Production of the water-absorbing resin was conducted using the reverse phase suspension polymerization method. In the production of the water-absorbing resin, for the water-soluble ethylenic unsaturated monomers, a two-stage polymerization reaction was conducted using the reverse phase suspension polymerization method using the radical polymerization initiator in the presence of a dispersion stabilizer in the petroleum-based hydrocarbon dispersion medium.

9,000 kg of n-heptane whose temperature was maintained at 25° C. as the petroleum-based hydrocarbon dispersion medium and 351 kg of n-heptane solution of 10% by mass of a polyglycerin fatty acid ester as the dispersion stabilizer (trade name: Sunsoft Q-185S, produced by Taiyo Chemicals Co., Ltd.) were put in the reactor main body.

The content of the reactor main body was heated for the temperature thereof to reach 90° C. stirring the inside of the reactor main body by the stirring means, and the dispersion stabilizer was thereby solved. The content of the reactor main body was cooled for the temperature thereof to reach 50° C.

On the other hand, in another container, 3,505 kg of acrylic acid water solution of 80% by mass was added as the water-soluble ethylenic unsaturated monomers and 3,890 kg of sodium hydroxide water solution of 30% by mass was dropped in droplets as the alkaline neutralizer being cooled, to conduct neutralization for the degree of neutralization to be 75% by mol of the acid radicals of the water-soluble ethylenic unsaturated monomers. 3.5 kg of potassium peroxodisulfate as the radical polymerization initiator, 0.7 kg of N,N'-methylenebisacrylamide as the cross-linking agent, and 1,908 kg of water were further added to be solved together and the monomers for the first-stage polymerization was prepared as a water solution.

The overall amount of the monomer water solution for the first-stage polymerization that was prepared in the other container as above and whose temperature was maintained at 10° C. was added to the reactor main body, the temperature of the content of the reactor main body was set to be 30° C., and the inside of the system was fully substituted by nitrogen.

The content of the reactor main body was heated for the temperature thereof to reach 55° C. stirring the inside of the reactor main body by the stirring means to start the polymerization. After the start of the polymerization, the temperature of the content of the reactor main body was increased by the polymerization heat and, from the time point at which the temperature of the content reached 80° C., the polymerization was conducted at 80° C. for 30 minutes. The content of the reactor main body was thereafter cooled for the temperature thereof to reach 13° C. to acquire a reaction mixture of the first stage.

On the other hand, a monomer water solution for the second-stage polymerization was prepared in the other container. For example, in the other container, 3,505 kg of acrylic acid water solution of 80% by mass was added as the water-soluble ethylenic unsaturated monomers and 3,890 kg of sodium hydroxide water solution of 30% by mass was dropped in droplets as the alkaline neutralizer being cooled to conduct neutralization for the degree of neutralization to be 75% by mol of the acid radicals of the water-soluble ethylenic unsaturated monomers. 3.5 kg of potassium peroxodisulfate as the radical polymerization initiator, 0.7 kg of N,N'-methylenebisacrylamide as the cross-linking agent, and 1,908 kg of water were further added to be solved together and the monomer water solution for the second-stage polymerization was prepared.

The overall amount of the monomer water solution for the second-stage polymerization that was prepared in the other container as above and whose temperature was maintained at 13° C. was put into the reactor main body that accommodated the above first-stage reaction mixture, and the inside of the system was sufficiently substituted by nitrogen.

The content of the reactor main body was heated for the temperature thereof to reach 55° C. stirring the inside of the reactor main body by the stirring means, to start the polymerization. After the start of the polymerization, the temperature of the content of the reactor main body was increased by the polymerization heat and, from the time point at which the temperature of the content reached 80° C., the polymerization was conducted at 80° C. for 30 minutes to thereafter acquire a reaction mixture of the second stage.

The reaction mixture of the second stage was transferred to a condensing device, and the content of the condensing device was heated for the temperature thereof to be 90° C. stirring the inside of the condensing device by the stirring means. Azeotropic distilling was conducted for reaction mixture with n-heptane and water to separate the n-heptane and the water therefrom to return the n-heptane to the condensing device and to extract the water to the exterior of the system. The water-absorbing resin particle precursor (A) was thereby acquired.

Example 1

The water-absorbing resin particle precursor (A) acquired in the production example was transferred to a channel-type stirring dryer (manufactured by Nara Machinery Co., Ltd., a uniaxial paddle dryer: corresponding to the treating apparatus 1) that included a spray nozzle 1/4MVV8005S303 (a one-fluid standard sector nozzle manufactured by Ikeuchi Co., Ltd.: corresponding to the spray nozzle 142: no mesh strainer was disposed in the spray nozzle) and a Y-shaped strainer of 100 mesh (corresponding to the strainer 45) disposed on the outer side of the treatment container, 2.8 kg of ethyleneglycoldiglycidyl ether was sprayed thereto as the cross-linking agent using the spray nozzles (the spray pressure: 0.3 MPa), and the content in the dryer main body was reacted at 90° C. to acquire a reaction mixture that was surface-cross-linked. After the spraying, the spray nozzles were washed with pure water and purge was conducted therefor using nitrogen.

The surface-cross-linked reaction mixture was further heated, and the water and the n-heptane were thereby extracted to the exterior of the system to acquire dried water-absorbing resin particles (B). This step (the surface cross-linking step) was continuously conducted for 3 months and, when the produced and dried water-absorbing resin particles (B) were extracted from the dryer after 3 months, sampling was conducted for each of the initial phase (when 10% of the overall amount was discharged), the intermediate phase (when 50% of the overall amount was discharged), and the final phase (when 90% of the overall amount was discharged) to thereby conduct measurement of the normal saline solution retention capacity. The result of the measurement is presented in Table 1.

The Y-shaped strainer was checked and adhesion of any foreign object and any polymerization product of acrylic acid were not observed. The inside of each of the spray nozzles was checked and adhesion of any polymerization product of acrylic acid was not observed.

Comparative Example 1

The water-absorbing resin particle precursor (A) acquired in the production example was transferred to a channel-type stirring dryer (manufactured by Nara Machinery Co., Ltd., a uniaxial paddle dryer) that included a spray nozzle 1/4MVV8005S303 with 6051-SS-100 (a one-fluid standard sector nozzle manufactured by Ikeuchi Co., Ltd.: corresponding to the spray nozzle 142, a 100-mesh strainer incorporating a spray nozzle: corresponding to the strainer 150), 2.8 kg of ethyleneglycoldiglycidyl ether was sprayed thereto as the cross-linking agent using the spray nozzle (the spray pressure: 0.3 MPa), and the content in the dryer main body was reacted at 90° C. to acquire a reaction mixture that was surface-cross-linked. After the spraying, the spray nozzle was washed with pure water and purge was conducted therefor using nitrogen.

The surface-cross-linked reaction mixture is further heated, and the water and the n-heptane were thereby extracted to the exterior of the system to acquire dried water-absorbing resin particles (C). This step (the surface cross-linking step) was continuously conducted for 3 months and, when the produced and dried water-absorbing resin particles (C) were extracted from the dryer after 3 months, sampling was conducted for each of the initial phase (when 10% of the overall amount was discharged), the intermediate phase (when 50% of the overall amount was discharged), and the final phase (when 90% of the overall amount was discharged) to thereby conduct measurement of the normal saline solution retention capacity. The result of the measurement is presented in Table 1.

The strainer incorporated in the spray nozzle was checked and adhesion of the polymerization product of acrylic acid was observed for 80% of the strainers.

TABLE 1

| | Normal Saline Solution Retention Capacity [g/g] | | |
|---|---|---|---|
| | Initial Phase | Intermediate Phase | Final Phase |
| Example 1 | 35.1 | 34.8 | 35.2 |
| Comparative Example 1 | 40.9 | 34.8 | 34.2 |

As shown in Table 1, for Example 1, no dispersion is present in the normal saline solution retention capacity among the initial phase, the intermediate phase, and the final phase and, for Comparative Example 1, dispersion occurs in the normal saline solution retention capacity among the initial phase, the intermediate phase, and the final phase. For Example 1, no adhesion of the polymerization product of acrylic acid to the strainer was observed while, for Comparative Example 1, adhesion of the polymerization product of acrylic acid was observed for 80% of the strainers. The initial phase, the intermediate phase, and the final phase are the timings of taking out the water-absorbing resin particles from the treatment container, and the treatment time period and the conditions for the surface cross-linking treatment for the water-absorbing resin particle precursor were substantially same.

It can be considered that, in Example 1, the surface cross-linking agent was uniformly mixed with the surface of the water-absorbing resin particle precursor, the surface cross-linking agent was uniformly present in the vicinity of the surface of each of the water-absorbing resin particles, uniform surface cross-linking was conducted, no dispersion was thereby present in the normal saline solution retentions capacity among the initial phase, the intermediate phase, and the final phase, and a product with constant physical properties was acquired.

It can be considered that, in contrast, in Comparative Example 1, the surface cross-linking agent was not uniformly mixed with the surface of the water-absorbing resin particle precursor, and, in the initial phase, the surface cross-linking agent was little in the vicinity of the surface of each of the waster-absorbing resin particles. It can be considered that, in the initial phase, the surface cross-linking was therefore weakly conducted and the normal saline solution retention capacity was therefore high while the physical properties such as the liquid passage property and the gel strength were degraded. It can be considered that, on the contrary, in the final phase, the surface cross-linking agent was much in the vicinity of the surface of each of the waster-absorbing resin particles compared to that of the initial phase. It can be considered that, in the final phase, the surface cross-linking was therefore strongly conducted compared to that of the initial phase and the physical properties such as the liquid passage property and the gel strength were improved while the normal saline solution retention capacity was degraded. As above, in Comparative Example 1, the dispersion occurred in the normal saline solution retention capacity compared to that of Example 1 and no product with constant physical properties was acquired.

From the above, it was confirmed that, in Comparative Example 1, some of the unreacted monomers remaining in the water-absorbing resin particles vaporized to adhere to the strainer that was incorporated in the spray nozzle and the heat was transmitted thereto to cause polymerization thereof to thereby cause the blocking out in the strainer to occur. It can be seen that this blocking out of the strainer degraded the function of the spray nozzle and the surface cross-liking agent was thereby unable to be uniformly supplied to the surface of the water-absorbing resin particle precursor.

As above, as in Example, according to this disclosure, at least one filter (the strainer) is present between the spray nozzle that sprays a liquid substance to the water-absorbing resin particle precursor and the tank that supplies the liquid substance, and the temperature of the filter (the strainer) was controlled to be preferably 0 to 40° C., more preferably 14° C. to 40° C., further preferably 15° C. to 30° C., and further more preferably 15° C. to 25° C. Any clocking out of the spray nozzle can thereby be prevented and a product with constant physical properties can stably be produced. The temperature of the Y-shaped strainer of Example 1 was 17° C. and the temperature of the 100-mesh strainer incorporated in the spray nozzle of Comparative Example 1 was 100° C. It can be considered that the temperature of the 100-mesh strainer of Comparative Example 1 was a high temperature compared to that of the Y-shaped strainer of Example 1, and the polymerization of the adhering substance of the unreacted monomers was thereby further advanced to cause the blocking out of the strainer.

Properly combining any optional embodiments with each other, of the above various embodiments can cause each of the optional embodiments to achieve the effect to be achieved thereby.

This disclosure fully describes in relation to the preferred embodiment with reference to the accompanying drawings while various deformations and various modifications are obvious for those skilled in the art. It should be understood that these deformations and modifications are encompassed in this disclosure without departing from the scope of this disclosure stipulated in the appended claims.

When the apparatus for producing water-absorbing resin particles of this disclosure is used, any blocking out of the spray nozzle can be suppressed. Sufficient and uniform surface treatment is therefore enabled for the surface of the water-absorbing resin particle precursor and water-absorbing resin particles having stable quality can be produced.

EXPLANATIONS OF LETTERS OR NUMERALS 1 treating apparatus (apparatus for producing water-absorbing resin particles)
2 tank
3 pump
4 pure water supply line
5 nitrogen supply line
10 treatment container 11 input entrance
12 discharge exit
20 stirring device
21 stirring board
22 rotational shaft
23 rotation driving device
30 heating device
31 heat transmitting part
32 heating jacket
40 spray device
41 supply line
42 spray nozzle
43 first pipe
44 second pipe
45 strainer
51 spray exit
52 chip part
53 entrance
54 main body part
55 cap part

The invention claimed is:

1. A method for producing water-absorbing resin particles, the method comprising a surface cross-linking treatment being conducted by spraying a surface cross-linking agent to a water-absorbing resin particle precursor and heating the agent and the precursor, the water-absorbing resin particle precursor including unreacted monomers, wherein
the surface cross-linking treatment is conducted by an apparatus for producing water-absorbing resin particles, and
the apparatus includes:
a treatment container in which the surface cross-linking treatment is conducted;
a stirring device including a stirring member disposed in the treatment container;
a heating device that heats an inside of the treatment container;
a decompressing device that reduces a pressure in the treatment container; and
a spray nozzle disposed in the treatment container, the spray nozzle spraying into the treatment container the surface cross-linking agent, in a flow path in the spray nozzle spanning from an entrance of the spray nozzle to a spray exit, a point whose opening cross-section is smallest in a flow path through which a fluid passes is the spray exit.

2. The method for producing water-absorbing resin particles according to claim 1, the apparatus comprising a strainer disposed in a supply pipe on an upstream side of the entrance of the spray nozzle, the strainer including plural openings each having an opening cross-section smaller than an opening cross-section of the spray exit of the spray nozzle.

3. The method for producing water-absorbing resin particles according to claim 2, wherein the heating device is a heating jacket arranged on an outer circumference of the treatment container, and the strainer is disposed in the supply pipe on an outer side of the heating jacket.

4. The method for producing water-absorbing resin particles according to claim 2, wherein
the supply pipe for the surface cross-linking agent includes a first pipe that is a header pipe having plural spray nozzles connected thereto and a second pipe that connects the surface cross-linking agent supply source and the first pipe to each other, and
the first pipe and the plural spray nozzles are arranged inside the treatment container, and the strainer is disposed in a portion on an outer side of the treatment container, of the second pipe.

5. The method for producing water-absorbing resin particles according to claim 2, the apparatus further comprising a cooling device that cools the strainer.

6. The method for producing water-absorbing resin particles according to claim 2, wherein a nitrogen supply pipe is connected to the supply pipe.

7. The method for producing water-absorbing resin particles according to claim 1, wherein the heating device includes a heat transmitting part that is arranged in an inside of the stirring device.

8. The method for producing water-absorbing resin particles according to claim 2, wherein the strainer is disposed on a downstream side of a pump which is disposed in the supply pipe to supply the surface cross-linking agent to the spray nozzle through the supply pipe.

9. A method for producing water-absorbing resin particles, the method comprising:
spraying a surface cross-linking agent to a water-absorbing resin particle precursor in a treatment container, the water-absorbing resin particle precursor including unreacted monomers;
stirring the water-absorbing resin particle precursor in the treatment container;
heating the surface cross-linking agent and the water-absorbing resin particle precursor in the treatment container; and
reducing a pressure in the treatment container, wherein
the surface cross-linking agent is sprayed into the treatment container through a spray nozzle disposed in the treatment container, in a flow path in the spray nozzle spanning from an entrance of the spray nozzle to a spray exit, a point whose opening cross-section is smallest in a flow path through which a fluid passes is the spray exit.

* * * * *